(12) United States Patent
Mullin et al.

(10) Patent No.: US 12,480,708 B2
(45) Date of Patent: Nov. 25, 2025

(54) SYSTEM FOR TEMPERATURE MAPPING IN TEMPERATURE-CONTROLLING STORAGE UNITS

(71) Applicants: T. Patrick Mullin, Franklin, MA (US); Ethan P. Mullin, Franklin, MA (US)

(72) Inventors: T. Patrick Mullin, Franklin, MA (US); Ethan P. Mullin, Franklin, MA (US)

( * ) Notice: Subject to any disclaimer, the term of this patent is extended or adjusted under 35 U.S.C. 154(b) by 217 days.

(21) Appl. No.: 17/978,794

(22) Filed: Nov. 1, 2022

(65) Prior Publication Data

US 2024/0142168 A1    May 2, 2024

(51) Int. Cl.
| | |
|---|---|
| *F25D 29/00* | (2006.01) |
| *F25D 23/02* | (2006.01) |
| *F25D 23/06* | (2006.01) |

(52) U.S. Cl.
CPC ......... *F25D 29/005* (2013.01); *F25D 23/028* (2013.01); *F25D 23/065* (2013.01); *F25B 2700/02* (2013.01); *F25D 2323/06* (2013.01); *F25D 2400/36* (2013.01); *F25D 2700/12* (2013.01); *F25D 2700/123* (2013.01)

(58) Field of Classification Search
None
See application file for complete search history.

(56) References Cited

U.S. PATENT DOCUMENTS

| | | | |
|---|---|---|---|
| 3,727,420 A | 4/1973 | Kosfeld | |
| 3,945,217 A * | 3/1976 | Bashark | F25D 21/002 62/176.1 |
| 4,407,141 A | 10/1983 | Paddock | |
| 5,228,300 A | 7/1993 | Shim | |
| 5,309,722 A | 5/1994 | Phillips, Jr. | |
| 5,488,834 A | 2/1996 | Schwarz | |
| 5,533,349 A | 7/1996 | Gromala | |
| 6,095,427 A | 8/2000 | Hoium | |
| 6,453,687 B2 | 9/2002 | Sharood | |
| 7,228,691 B2 | 6/2007 | Street | |
| 7,711,451 B2 | 5/2010 | Aue | |
| 9,449,208 B2 | 9/2016 | Luk | |
| 10,240,836 B2 | 3/2019 | Wallace | |
| 2003/0041606 A1 | 3/2003 | Kim | |
| 2003/0131541 A1* | 7/2003 | Lee | F25D 17/045 52/79.1 |
| 2004/0182098 A1 | 9/2004 | Lee | |

(Continued)

FOREIGN PATENT DOCUMENTS

| | | |
|---|---|---|
| CN | 2453365 Y | 10/2001 |
| CN | 201028927 Y | 2/2008 |

(Continued)

*Primary Examiner* — Jerry-Daryl Fletcher
*Assistant Examiner* — Daniel C Comings
(74) *Attorney, Agent, or Firm* — Lambert Shortell & Connaughton; David J. Connaughton, Jr.; Justin P. Tinger

(57) ABSTRACT

The various components of the controlled temperature unit allow the unit to control temperature and collect or manage temperature data. The controlled temperature unit may be equipped with multiple temperature probes, and data generated by these probes may be managed by a process control unit housed within the wall of the controlled temperature unit. The process control unit may then be operable to display temperature related data on a visual display attached to one of the exterior walls of the controlled temperature unit.

18 Claims, 4 Drawing Sheets

(56) References Cited

U.S. PATENT DOCUMENTS

| | | | |
|---|---|---|---|
| 2005/0155372 A1* | 7/2005 | Dentella | F25D 17/065 |
| | | | 62/408 |
| 2007/0017238 A1 | 1/2007 | Malpetti | |
| 2010/0287963 A1* | 11/2010 | Billen | A01N 1/0252 |
| | | | 62/126 |
| 2012/0079840 A1* | 4/2012 | Lukasse | F25D 29/00 |
| | | | 62/159 |
| 2017/0307446 A1* | 10/2017 | Hegedus | F25D 29/008 |
| 2019/0331410 A1 | 10/2019 | Li et al. | |
| 2022/0120495 A1* | 4/2022 | AiSong | F25D 29/005 |
| 2022/0325943 A1 | 10/2022 | May et al. | |

FOREIGN PATENT DOCUMENTS

| | | | | |
|---|---|---|---|---|
| EP | 3339782 | | 12/2017 | |
| JP | H08226756 A | * | 9/1996 | F25D 29/005 |
| KR | 102263403 B1 | * | 6/2021 | F25D 2700/123 |
| WO | WO-2014171119 A1 | * | 4/2014 | F25D 29/00 |
| WO | 2016087084 A1 | | 6/2016 | |
| WO | WO-2019/224940 A1 | * | 11/2019 | F25D 13/00 |

\* cited by examiner

SYSTEM FOR TEMPERATURE MAPPING IN TEMPERATURE-CONTROLLING STORAGE UNITS

BACKGROUND

Technical Field

The present disclosure relates generally to a controlled temperature unit (CTU), which includes reach-in or walk-in commercial refrigerators, freezers, incubators, and the like. More particularly the present disclosure relates to an improved controlled temperature unit comprising a plurality of temperature probes within the refrigerated space of the unit in order to facilitate commissioning, qualification, and periodic maintenance of the validated state of a CTU.

Description of Related Art

In the biotechnology and chemical space, temperature control is a key critical quality design feature supporting the manufacturing of therapeutic drug substance. The biotechnology industry, for example, is heavily regulated and must abide by rules and regulations of the US federal government set forth by the Food and Drug Administration ("FDA"). All therapeutic drug substances and products must meet minimum requirements for safety, identity, strength, purity, and quality, as set forth in at least the Food, Drug, and Cosmetic Act of 1938, as interpreted and enforced by rules promulgated under the FDA's authority. Of course, proper temperature control is of critical importance in many other industries as well.

In the manufacture of therapeutic drug substances, for example, manufacturers use CTUs to store reagents, testing samples, in-process manufacturing samples, process intermediate aliquots, bulk or final storage aliquots, stability samples, and the like in carefully controlled temperature conditions where temperature uniformity, and sometimes humidification uniformity, are maintained within tight performance tolerances. Prior to first use, a CTU must be commissioned and qualified as fit-for-use before being released for use in manufacturing, or manufacturing supporting, activities. The commissioning and qualification of CTUs is performed with external temperature mapping devices which are used to perform various temperature studies across several days. Once a CTU is in its operational state, the validated state of a CTU's performance attributes are periodically retested (on average every 1-3 years) in a process called requalification. In the requalification activity, all testing performed on a CTU prior to release to manufacturing is repeated to ensure that the CTU continues to operate in a state of control. In the event of a failure during requalification testing, a quality event is initiated, referred to as a deviation, and a process of containment, investigation, root cause identification, and corrective and/or preventative action plans are initiated.

Quality events are expensive and time consuming, and similar units to the defective controlled temperature unit can be pulled into a deviation and are often similarly impacted. CTUs that have been identified with performance issues may directly or indirectly impact product quality or patient safety; and by extension, create significant business impact to an organization. For scale, the number of CTUs in a single life sciences company can run in the hundreds to the thousands.

There are numerous potential solutions to the problems with modern controlled temperature units, but the results of implementing any one of these potential solutions is not readily ascertainable due to the expansive list of system failures that may impact the validated state of a controlled temperature unit over time. For example, compressors may lose BTU capacity over time, resulting in less effective temperature control. Frost buildup may break through gasketed seals and introduce local temperature gradients within a controlled temperature unit. Operators might overload shelves in the controlled temperature unit with too many components and introduce poor airflow conditions in the controlled temperature unit, which may also prevent effective temperature control. Moreover, short duration power failures followed by recoveries and extended open door events may introduce local temperature deviations, which when compounded may ultimately cause a controlled temperature unit to lose effectiveness entirely.

In short, there are a number of problems in the current state of the art with the operation and maintenance of controlled temperature units, to which there are a seemingly endless number of solutions. Therefore, what is needed is an improved controlled temperature unit having the following characteristics and benefits over the prior art.

SUMMARY

The subject matter of this application may involve, in some cases, interrelated products, alternative solutions to a particular problem, and/or a plurality of different uses of a single system or article.

In one aspect, a controlled temperature unit is disclosed. In this aspect, the controlled temperature unit is constructed from walls that define an interior and exterior for the unit. The unit has an insulated chamber on the interior of the walls, and a door attaches to the exterior of the walls and provides access to the insulated chamber inside. Also in this aspect, the unit comprises temperature probes and shelves attached to the interior surfaces of the walls within the insulated chamber.

In another aspect, an automated temperature control system for the controlled temperature unit of the previous aspect is disclosed. In this aspect, the automated temperature control system includes a process control unit housed within the walls and shelves of the controlled temperature unit. Also in this aspect, the temperature probes are electrically connected to the process control unit, and the process control unit is operable to receive temperature inputs from the temperature probes and maintain a constant temperature within the insulated chamber of the controlled temperature unit. Further, in many embodiments, the process control unit may be operable to communicate with an external monitoring system.

It should be expressly understood that the various physical elements of the present disclosure summarized and further disclosed herein may be of varying sizes, shapes, or otherwise dimensions and made from a variety of different materials or methods of manufacture without straying from the scope of the present disclosure.

DETAILED DESCRIPTION

Figure 1:
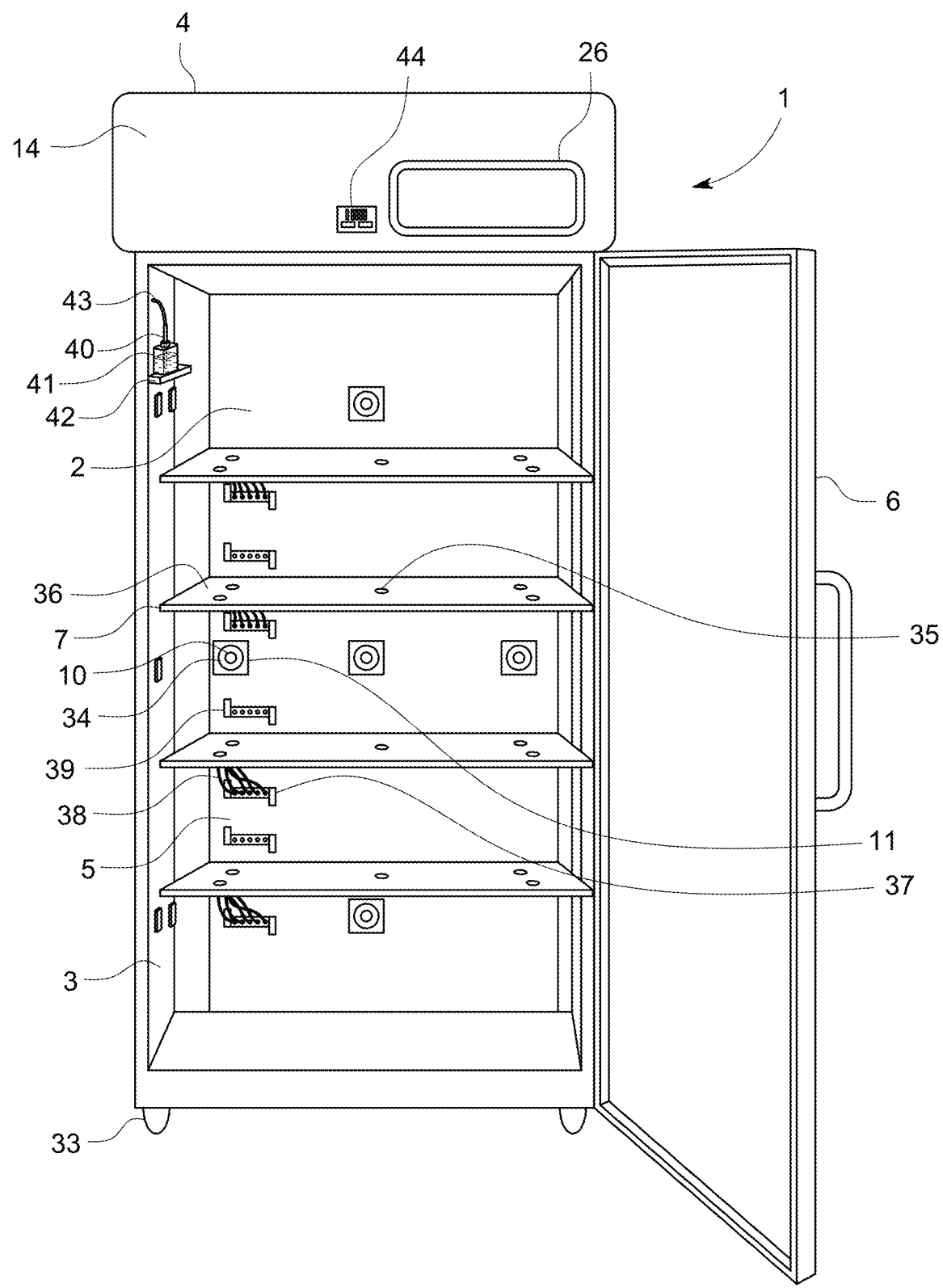
FIG. 1 provides a perspective view of an embodiment of the controlled temperature unit disclosed herein.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns an improved controlled temperature unit ("CTU"). In most embodiments, the CTU may be equipped with multiple temperature probes, and data generated by these probes may be managed by a process control unit ("PCU") housed within the walls of the CTU. The PCU may then be operable to display temperature related data and/or information on a visual display attached to one of the exterior walls and shelves of the CTU. Data generated by the temperature probes may be trended individually or collectively on the visual display to allow for each of temperature control, calibration, commissioning, validation, maintenance, and otherwise ensure compliance of the CTU throughout its lifecycle. In further embodiments, the PCU is operable to communicate with a remote or external monitoring system through a data connection, which may be wired, wireless, through an internet connection, and the like.

In most embodiments, the CTU may be constructed with insulated walls housing an interior, insulated chamber. The insulated chamber may comprise a plurality of temperature probes attached within, and protruding into, the interior walls of the CTU. In some embodiments, shelves within the insulated chamber may also be equipped with temperature probes. In a particular, non-limiting embodiment, the CTU may have five temperature probes on each internal wall and five temperature probes on each shelf. This allows for optimal temperature measurement without an excess of probes and conforms to common industry best practices of existing testing protocols. Of course, temperature probe configuration may vary without straying from the scope of this disclosure. The temperature probes may be resistive temperature devices or thermocouple devices. Each temperature probe may be connected to or protrude from terminal strips defined in the walls of the insulated chamber, and each probe is preferably constructed in such a way as to allow for easy removal for service, preventative maintenance, replacement, or calibration.

It is preferred that all interior surfaces and components are accessible for manual cleaning. While the surfaces of the CTU and its various internal and external components may be constructed from any suitable material, internal and external components of the CTU, including, but not limited to, all surfaces, shelves, temperature probes, terminal strips, and the like should preferably be constructed of materials that are chemically resistant to laboratory cleaning chemicals.

In order for the temperature within the CTU to be effectively controlled, in most embodiments, the CTU may comprise a PCU to receive inputs from the various temperature probes in the insulated chamber and process said inputs for monitoring and control of the CTU's performance. In one embodiment, a plurality of temperature probes may be mechanically connected to the CTU and electrically connected to the PCU (Process Control Unit), which, in combination with the other elements of the control system, may provide for a continuous temperature control within the insulated chamber of the CTU. The PCU may receive inputs from temperature probes regarding the current temperature within the insulated chamber. The PCU may then processes the received inputs and output a continuous temperature control for the insulated chamber. The control system and/or the PCU may continuously control the temperature of the insulated chamber by being electrically connected to a compressor. As will be appreciated by those skilled in the art, the compressor may be mechanically connected or housed within the walls of the CTU in order to effectively remove heat from the insulated chamber.

A visual display, which in a preferred embodiment may be a visual touch display or a touch screen, may be electrically connected to the PCU and mechanically attached to an exterior wall of the CTU. The visual display in communication with the PCU may allow users or operators to interface with the functionality of the CTU in a variety of ways. For example, one aspect of the present disclosure includes a non-transitory computer readable medium having instructions allowing and instructing a central data processor to carry out the steps required during operation of the CTU. The non-transitory computer readable medium or memory and the central data processor may be electrically connected on the PCU. Temperature data and/or instructions stored within the medium may be accessible through a wireless or wired electronic communication system, such as a network and/or internet connection or through an electronic relay attached to the exterior walls of the CTU.

The memory of the PCU may be utilized for the storage of temperature data received by the PCU from the temperature probes. A user may retrieve the stored temperature data in the form of a batch report, visually trended data, or the like, which the PCU may be operable to display on the visual touch display electrically connected to the PCU. The PCU may also be electrically connected to an exterior relay, which may be mechanically attached to an exterior surface of the CTU. The exterior relay may alert a user to a fault condition within the CTU. The PCU may be electrically connected to external circuitry and/or devices to communicate with and/or retrieve information from the PCU. For example, an external device may allow users to export CTU performance data to a building management system, data historian, or similar application.

The visual display in combination with the PCU and other electrical and mechanical components, that may be required for the functioning of the CTU, supports the maintenance of the validated state of the CTU. This combination of features may provide users or operators the ability to completely monitor temperature uniformity, self-map the validated state of the CTU on demand, self-calibrate against a built-in calibration reference standard, and even alarm locally and remotely in the event of a shift away from the established temperature control parameters set for the CTU.

For example, in one embodiment, the PCU may be operable to display a temperature of the insulated chamber on the visual touch display. In such an embodiment, the visual touch display may also be configured to display other information pertinent to the operation and functionality of the CTU, including, but not limited to, information regarding the temperature probes, stored temperature data, and alerts. The visual touch display may also provide security by only allowing certain users with log-in permissions to modify the operation settings of the CTU via a log-in and/or settings display.

In another embodiment, the PCU may also be operable to display and allow modification of (within the constraints of potential access privileges) set point parameters, configurable temperature control strategies, scrolling trend data for each individual probe or combination of probes (e.g., live and/or historically), and a status graphic of the chamber and probes, which may also be displayed on the visual touch display. The PCU may further be operable to record open door events by a user logging both the time and duration of the event on the display. In one embodiment, the PCU may then generate and display a performance trend of probe performance during the open-door event based on the previously mentioned user provided inputs.

Accordingly, the present disclosure represents an unexpected solution to several problems with other attempted solutions. One of the problems with other proposed solutions is that these solutions focus on simulating temperature outside of the CTU by the shift in probe response times located in the chamber in order to optimize CTU performance. Another misguided focus of such solutions is the focus on tracking the temperature of specific therapeutics or chemicals within the CTU and using this information to adjust the overall temperature of the CTU based on localized variations. Finally, other purported solutions include multiple temperature sensors or probes on the compressor of the CTU in order to simulate the temperature within the CTU.

The present disclosure expressly does not utilize the simulation of the exterior temperature of the CTU, the measurement of temperature changes associated with certain items stored within the CTU, or multiple temperature sensors or probes on the compressor. Instead, the improved CTU disclosed herein unexpectedly solves several known problems by comprising numerous temperature probes within the insulated chamber of the CTU that are electrically connected to a PCU housed within the body or walls of the CTU. This solution addresses the early detectability of risk characteristics that may cause a CTU to deviate from a validated state and provides engineering controls to monitor or alarm and provide live metrics. This solution may provide for a new class of CTUs that mitigates both compliance, regulatory, and business risks. In other words, the present disclosure provides a relatively simple, yet effective solution to allow for ongoing temperature uniformity monitoring, self-validation and self-calibration of temperature probes within the insulated chamber of the CTU throughout its entire lifecycle.

In one embodiment, the input strategy for control of the temperature within the insulated chamber may be user defined. The user may choose a single probe as the control probe, or a combination of probes inputs to meet the user's desired control strategy. Temperature control of the insulated chamber may include simple on/off control, on/off control with a cut off, or proportional-integral-derivative ("PID") control. With either type of on/off control, the compressor of the CTU may be turned on when needed to remove heat from the insulated chamber and turned off when the temperature within the insulated chamber is below a pre-set temperature. However, with PID control, the PCU is operable to maintain the insulated temperature of the CTU by measuring both a previous and present temperature variance and calculating a predicted future temperature variance in order to maintain a constant internal temperature through electronic communication with the temperature probes and the compressor.

Alternatively, or simultaneously, the PCU may be configured with user defined alarm functionality. In such an embodiment, the PCU may trigger an audible alarm, generate an alarm banner on the visual display, and/or turn off an external circuit relay to alert users or operators of the CTU that the temperature of the insulated chamber has deviated from pre-set parameters. Moreover, the PCU may be configured with security features, which may include login and password protection and potentially multiple security access levels (e.g., operator, supervisor, and engineer). Security controls may be created to prevent unauthorized users from modifying, creating, or deleting raw temperature data, or batch report, that contain information communicated from the probes and stored in the memory of the PCU.

Turning now to FIG. 1, which provides a perspective view of one embodiment of the CTU 1, wherein the CTU 1 has an interior and an exterior. The interior of the CTU 1 comprises an insulated chamber 2, which is generally constructed by combining left and right-side walls 3, top and bottom walls 4, a rear wall 5, and a front door 6. Depending on the embodiment, the door 6 may be a solid insulated door or a glass door. Within the interior of the insulated chamber 2, the CTU 1 has shelves 7, which may have their height or vertical location within the chamber 2 adjusted. The interior of the insulated chamber 2 also includes rungs, which are attached to both the left and right-side walls 3, and the shelves 7 are placed on top of the rungs. The heights or vertical locations of each individual shelf 7 may be adjusted by placing the shelf 7 on a different rung. The shelves 7 may also be removed from the insulated chamber 2.

In this embodiment, the interior surfaces of the left and right-side walls 3 and the rear wall 5 are constructed to accommodate a plurality of temperature probes 10. Accordingly, the left and right-side walls 3 and the rear wall 5 surfaces within the insulated chamber 2 include a plurality of terminal strips 11 defined in the interior wall surfaces of the insulated chamber 2. Each individual shelf probe 35 is plugged into a terminal strip 11, and the terminal strips 11 are generally positioned around the shelves 7 within the insulated chamber 2. As shown in the illustrated embodiment in FIG. 1, the number of terminal strips 11 within the insulated chamber 2 may depend on the configuration of the shelves 7 and rungs of the CTU 1.

In this embodiment, and still referring to FIG. 1, a visual touch display 26 is attached to an exterior wall surface 14 on the top of the CTU 1. In this embodiment, the CTU 1 includes wheels or casters 33 attached to the bottom of the CTU 1 to facilitate easy mobility. The casters 33 may be configured in a locked or unlocked position. Inside of this embodiment of the CTU 1, the rear wall 5 and the left and right-side walls 3 each comprise five temperature probes 10. As shown, the temperature probes 10 are arranged in a plus-sign pattern on the rear wall 5 and an X-shaped pattern on the left and right-side walls 3. This number and pattern for wall surface probe placements, in cooperation with shelf probe placements, facilitates the optimal probe placement geometry required for robust temperature monitoring.

Another critical aspect shown in at least one illustrated embodiment is the need for the temperature probe 10 design to facilitate cleaning within the interior of the CTU 1. Accordingly, in a preferred embodiment, each wall probe 10 is housed within an extruded, low profile thermowell 34.

Figure 2:
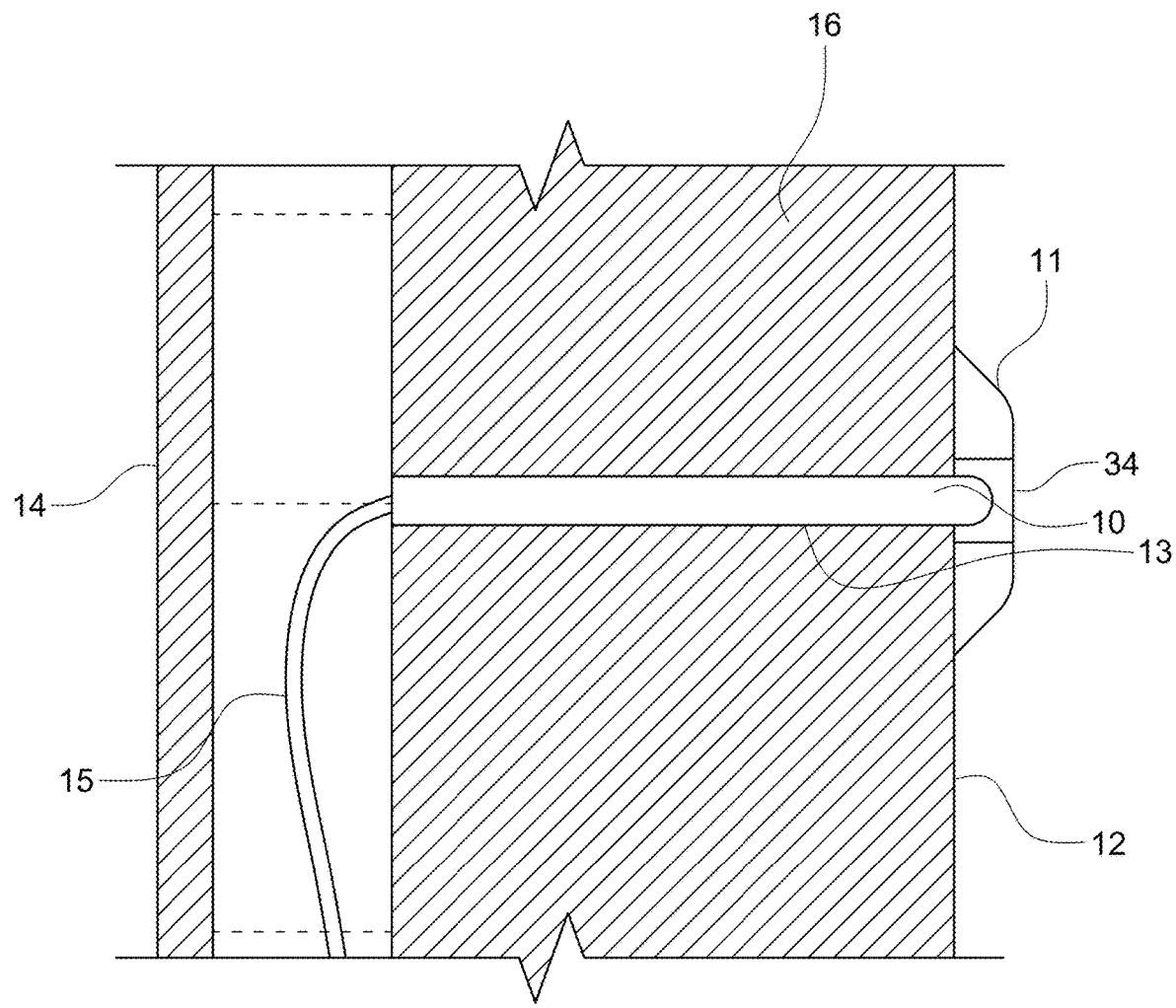
FIG. 2 provides a cross sectional view of a temperature probe inserted through the walls of the controlled temperature unit.

As shown in the partially exploded, cross-sectional view of FIG. 2, each wall temperature probe 10 is placed within the insulation 16 between an exterior wall surface 14 and an interior wall surface 12. The temperature probe 10 is connected to an automated temperature control system 45

(shown in FIG. 4) by at least one wire 15 and the probe 10 extends through a hole 13 bored in the insulation 16 to the extruded thermowell 34. The temperature probe 10 is not exposed to the interior of the CTU 1 because the extruded thermowell 34 protects the temperature probe 10 from being damaged during cleaning. In one embodiment, the thermowell 34 extrudes no more than 1" into the interior space, which further facilitates cleaning the interior wall surfaces 12 of the CTU 1 while also facilitating protection of the probe 10. Thus, this measurement may be considered critical.

Turning back to FIG. 1, to ensure uniform temperature readings while facilitating routine cleaning of the CTU 1, in one embodiment, the shelves 7 are equipped with shelf temperature probes 35, which are mounted within each shelf 7 and flush to a top surface 36 of each shelf 7. In a preferred embodiment, each shelf 7 comprises five shelf probes 35 arranged in an X-shaped pattern. This number and pattern for shelf probe 35 placement is critically important for the placement of items on each shelf 7, similar to how the number and pattern for wall temperature probe 10 placement is critical for probe placement within shelves 7 within the CTU 1.

Figure 3:
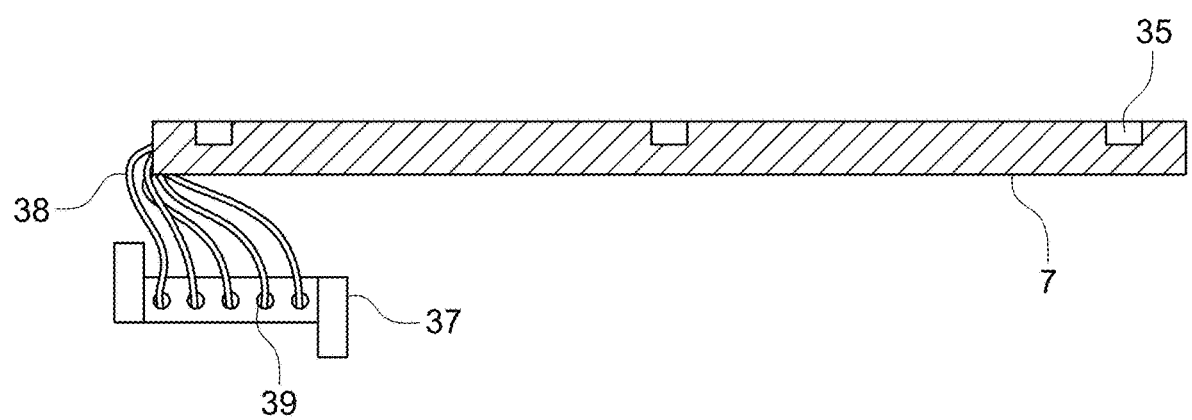
FIG. 3 provides a cross sectional view of an embodiment of a shelf having shelf probes connected to a terminal plug on a wall of the controlled temperature unit.

Each shelf probe 35 is connected to a shelf terminal strip 37. As shown in greater detail in the cross-sectional view of FIG. 3, all five shelf probes 35 are plugged into the shelf terminal strip 37 by ribbon wiring 38 connected to the keyed plugs 39 defined in the terminal strip 37. This configuration allows for the shelf probes 35 to be easily disconnected from the CTU 1 when shelves 7 are moved. Moreover, as shown in FIG. 1, having multiple open, disconnected shelf terminal strips 37 allows multiple additional shelves 7 to be installed in the CTU 1 without sacrificing the ability to support uniform temperature monitoring.

In one embodiment, it may be desirable to utilize the output from a single temperature control probe, directly exposed to the interior CTU environment or immersed in a thermal buffer solution, to control the temperature of the CTU 1, as opposed to utilizing the outputs from multiple wall and shelf probes 10, 35. Accordingly, in the embodiment shown in FIG. 1, the CTU 1 comprises a control probe 40 placed within a capped bottle 41 containing a liquid thermal buffer. In this embodiment, the bottle 41 is mounted on a bracket 42 that is connected to one of the left or right-side walls 3, and the control probe 40 is connected to the PCU 23 (shown in FIG. 4) by wiring 43. The liquid thermal buffer may be any liquid capable of preventing slight temperature fluctuations in the interior of the CTU 1 from triggering an alert or an alarm indicating non-uniform temperature within the CTU 1. In a preferred embodiment, the liquid may be glycol.

Figure 4:
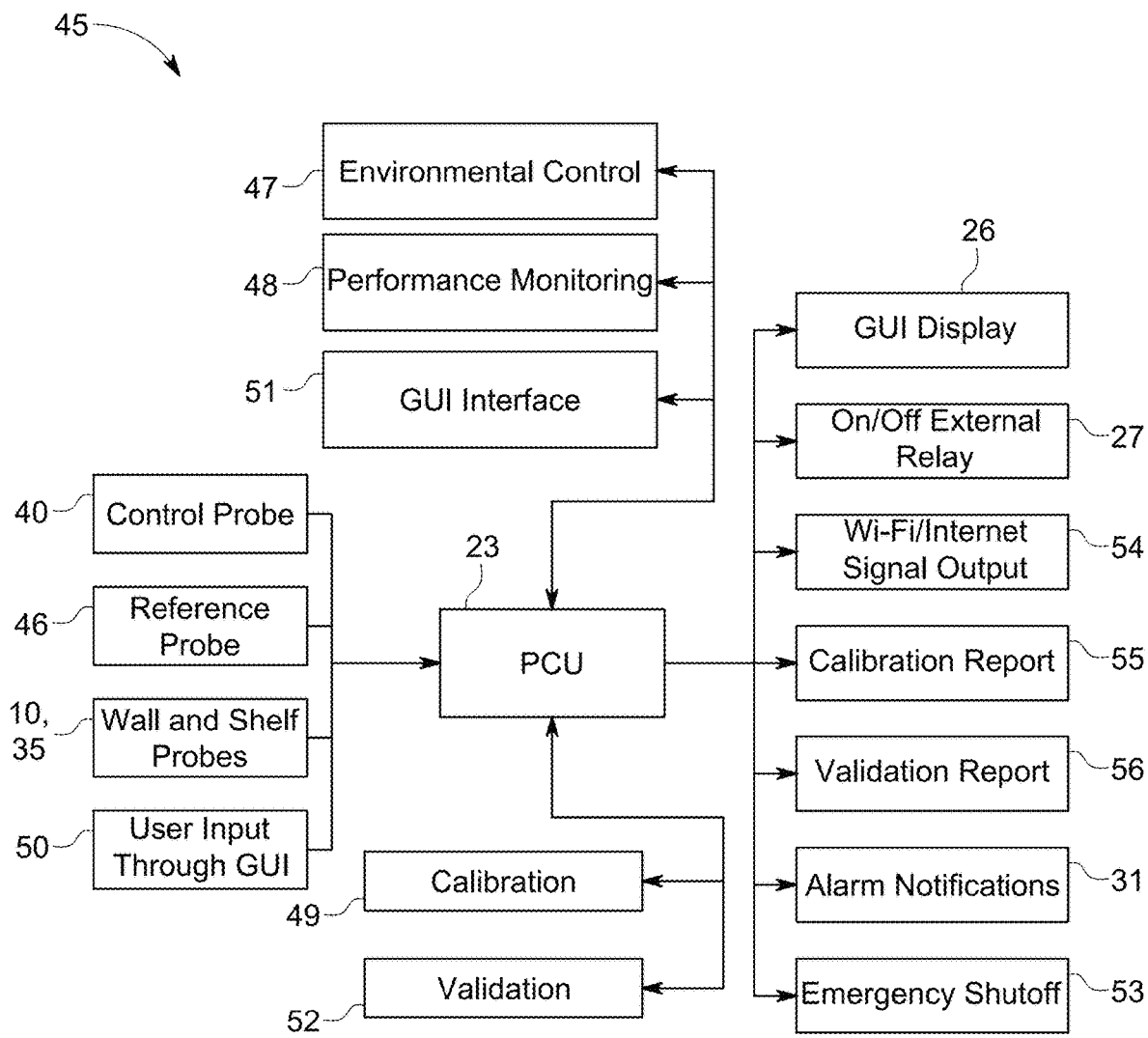
FIG. 4 provides a diagrammatic view of an embodiment of a control system utilized by a process control unit within the controlled temperature unit.

The concurrent use of a control probe 40 and wall and shelf probes 10, 35 allows for the unique control strategies that would be readily apparent to those skilled in the art after a review of the present disclosure. For example, as shown in FIG. 4, one embodiment of an automated temperature control system 45 for the CTU 1 utilizes inputs from a control probe 40, a reference probe 46, and/or wall and shelf probes 10, 35 either in combination or individually in order to conduct environmental control 47, performance monitoring 48, and calibration 49 of the CTU 1. In this embodiment, the reference probe 46 is connected to the PCU 23 and integrated into the CTU 1 to allow for the calibration 49 of wall and shelf probes 10, 35 without removing the probes 10, 35 from the CTU 1. A user may calibrate the reference probe 46 on a periodic basis, and the PCU 23 can communicate the outputs from the reference probe 46 to the wall and shelf probes 10, 35 to calibrate them against the reference probe 46.

A user can switch the control strategy utilized by the PCU 23 by providing inputs on a graphical user interface ("GUI") 50, such as a visual touch display 26. These user inputs 50 are translated by a GUI interface 51 of the PCU 23 in order to communicate the control strategy to be utilized by the CTU 1 to the probes and also to display the chosen strategy on the GUI or visual touch display 26. In this way, users are able to switch between using the output from a single temperature control probe 40 to using the outputs from multiple wall and shelf probes 10, 35 to control the temperature of the CTU 1. Utilizing multiple wall and shelf probes 10, 35 to control the temperature of the CTU 1 improves upon other known approaches because it takes into consideration temperature uniformity of the entire insulated chamber 2. This either significantly reduces or eliminates the likelihood of undetectable performance shifts or non-uniform temperature control within the CTU 1.

The various inputs provided by the probes 10, 35, and/or 40 and the user inputs on the GUI 50 provide the ability to track and trend temperature uniformity in support of conducting validation 52 of the CTU 1. Tracking and trending temperature data outputs from multiple wall and shelf probes 10, 35 for empty chamber, loaded chamber, open door, power interruption events, and the like eliminates the need for system owners or operators to take the CTU 1 out of service and restrict access to critical components in the CTU 1 for days at a time. Additionally, the PCU 23 is able to generate outputs that are accessible through the GUI display 26, an on/off external relay 27, a data port 44 on the exterior of the CTU 1 (see FIG. 1). The on/off external relay 27 coincides with the performance monitoring 48 of the PCU 23. Whenever an adverse condition is detected with, for example, the compressor 24, the electrical circuitry, a seal is broken, a door is left partially open, or frost builds up around the probes, and the like, the on/off external relay 27 and the emergency shutoff 53 may allow the CTU 1 to be turned off immediately for the attachment of functioning external circuitry of components to the relay 27.

The data port 44 coincides with all conducted steps of the PCU 23 that generate output data because the data port 44 allows the transfer of data from the CTU 1 to a remote data acquisition system, such as a building management system or data historian. In one embodiment, data generated by the PCU 23 includes, but is not limited to, a calibration report 55, a validation report 56, or alarm notifications 31, which may be local (e.g., audible or banner on the GUI 26) or remote (e.g., notification on remote data device). In one embodiment, these data outputs may be accessed through a wi-fi or internet signal output 54 from the PCU 23. Moreover, these outputs generated from temperature probe inputs may eliminate the need to maintain separate data acquisition equipment used to perform validation studies because the CTU 1 is capable of performing its own validation 52 through the PCU 23.

While several variations of the present disclosure have been illustrated by way of example in preferred or particular embodiments, it is apparent that further embodiments could be developed within the spirit and scope of the present disclosure, or the inventive concept thereof. However, it is to be expressly understood that elements described in one embodiment may be incorporated with any other embodiment in combination with any other elements disclosed herein in the various embodiments. It is also to be expressly understood that any modifications and adaptations to the present disclosure are within the spirit and scope of the present disclosure, and are inclusive, but not limited to the following appended claims as set forth.

What is claimed is:

1. A controlled temperature unit, allowing precise temperature control for drug storage, comprising:
   a plurality of walls defining an interior and an exterior;
      wherein the plurality of walls includes a rear wall and two side walls;
   an insulated chamber within the interior, wherein a door attached to the exterior of the plurality of walls provides access to the insulated chamber;
   a plurality of temperature probes within the insulated chamber attached to the plurality of walls;
      wherein, a body of each of the plurality of temperature probes is placed within an insulation between an exterior wall surface and an interior wall surface, and a tip of each of the plurality of temperature probes is placed out of the insulation and within an inner side of the interior wall surface;
   a plurality of shelves within the insulated chamber attached to the plurality of walls;
   a visual display;
   a process control unit (PCU), operable to:
      receive inputs from the plurality of temperature probes;
      process the inputs and output a continuous temperature control for the insulated chamber;
      display on the visual display configurable temperature control strategies, trend data for each or a combination of some of the plurality of temperature probes, and a status graphic of the insulated chamber and plurality of temperature probes and allow modification of set point parameters;
      record and display, on the visual display, open door events, including a time and duration;
      generate and display a performance trend of the plurality of temperature probes during each of the open door events;
      track and trend temperature uniformity in the insulated chamber, in support of a validation process;
      transfer temperature-control-relevant data to a remote data acquisition system, via a data port; and
      in response to an adverse condition being detected:
         send a signal to an external relay and initiate an emergency shutoff.

2. The controlled temperature unit of claim 1 further comprising a second plurality of temperature probes within the insulated chamber attached to each of the plurality of shelves.

3. The controlled temperature unit of claim 2 further comprising a plurality of terminal strips connected to the second plurality of temperature probes within the insulated chamber defined within the plurality of walls.

4. The controlled temperature unit of claim 1 wherein the plurality of temperature probes is housed within a plurality of extruded thermowells.

5. The controlled temperature unit of claim 1 wherein each one of the plurality of temperature probes is removable from the insulated chamber.

6. The controlled temperature unit of claim 1 wherein each one of the plurality of temperature probes is electrically connected to a controller housed within the plurality of walls of the controlled temperature unit.

7. The controlled temperature unit of claim 1 further comprising a visual display attached to an exterior surface of one of the plurality of walls.

8. The controlled temperature unit of claim 7 wherein the visual display is electrically connected to a controller housed within the plurality of walls of the controlled temperature unit.

9. The controlled temperature unit of claim 1, further comprising a calibration reference probe.

10. The controlled temperature unit of claim 1, further comprising a control probe attached to one of the plurality of walls in the interior of the controlled temperature unit, immersed in a thermal buffer solution.

11. An automated temperature control system for a controlled temperature unit, the controlled temperature unit comprises:
   a plurality of walls defining an interior and an exterior;
   an insulated chamber within the interior, wherein a door attached to the exterior of the plurality of walls provides access to the insulated chamber;
   a plurality of shelves attached to the interior of the plurality of walls;
   a plurality of temperature probes within the insulated chamber attached to the interior of the plurality of walls and attached to the plurality of shelves;
      wherein, a body of each of the plurality of temperature probes is placed within an insulation between an exterior wall surface and an interior wall surface, and a tip of each of the plurality of temperature probes is placed out of the insulation and within an inner side of the interior wall surface;
   the automated temperature control system comprising:
      a controller housed within the plurality of walls of the controlled temperature unit;
      the plurality of temperature probes electrically connected to the controller; and
      a visual display;
      wherein the controller is operable to:
         receive inputs from the plurality of temperature probes;
         process the inputs and output a continuous temperature control for the insulated chamber;
         display on the visual display configurable temperature control strategies, trend data for each or a combination of some of the plurality of temperature probes, and a status graphic of the insulated chamber and plurality of temperature probes and allow modification of set point parameters;
         record and display, on the visual display, open door events, including a time and duration;
         generate and display a performance trend of the plurality of temperature probes during each of the open door events;
         track and trend temperature uniformity in the insulated chamber, in support of a validation process;
         transfer temperature-control-relevant data to a remote data acquisition system, via a data port; and
         in response to an adverse condition being detected:
            send a signal to an external relay and initiate an emergency shutoff.

12. The automated temperature control system of claim 11 further comprising a compressor electrically connected to the controller.

13. The automated temperature control system of claim 11 further comprising the exterior relay attached to an exterior surface of one of the plurality of walls of the controlled temperature unit and electrically connected to the controller.

14. The automated temperature control system of claim 11 wherein the controller is operable to display a temperature of the insulated chamber on the visual display.

15. The automated temperature control system of claim 11 wherein the controller is operable to record a validation event and display a performance trend for the plurality of temperature probes during the validation event.

16. The automated temperature control system of claim 11, wherein the controller is operable to receive and transmit information to the visual display to allow user interaction with a performance of the controlled temperature unit, or a temperature mapping data from the controlled temperature unit, from the plurality of temperature probes.

17. A controlled temperature unit, allowing precise temperature control for drug storage, comprising:
 a plurality of walls defining an interior and an exterior;
  wherein the plurality of walls includes a rear wall and two side walls;
 an insulated chamber within the interior, wherein a door attached to the exterior of the plurality of walls provides access to the insulated chamber;
 a plurality of temperature probes within the insulated chamber attached to the plurality of walls;
  wherein, a body of each of the plurality of temperature probes is placed within an insulation between an exterior wall surface and an interior wall surface, and a tip of each of the plurality of temperature probes is placed out of the insulation and within an inner side of the interior wall surface;
 a plurality of shelves within the insulated chamber attached to the plurality of walls;
 wherein, among the plurality of temperature probes, a first group of five temperature probes is arranged in a plus-sign pattern on the rear wall;
 wherein, among the plurality of temperature probes, a second group and a third group of five temperature probes are respectively arranged in an X-shaped pattern on each of the two side walls;
 wherein, the first group of five temperature probes is the only temperature probes arranged on the rear wall;
 wherein, the second group and the third group of five temperature probes are the only temperature probes arranged on the side walls.

18. The controlled temperature unit of claim 17, wherein, among the plurality of temperature probes, one or more fourth groups of five temperature probes are each arranged in an X-shaped pattern, each of the one or more fourth groups of five temperature probes on each of the plurality of shelves, and the one or more fourth groups of five temperature probes are the only probes arranged on the plurality of shelves.

* * * * *